Patented Dec. 9, 1924.

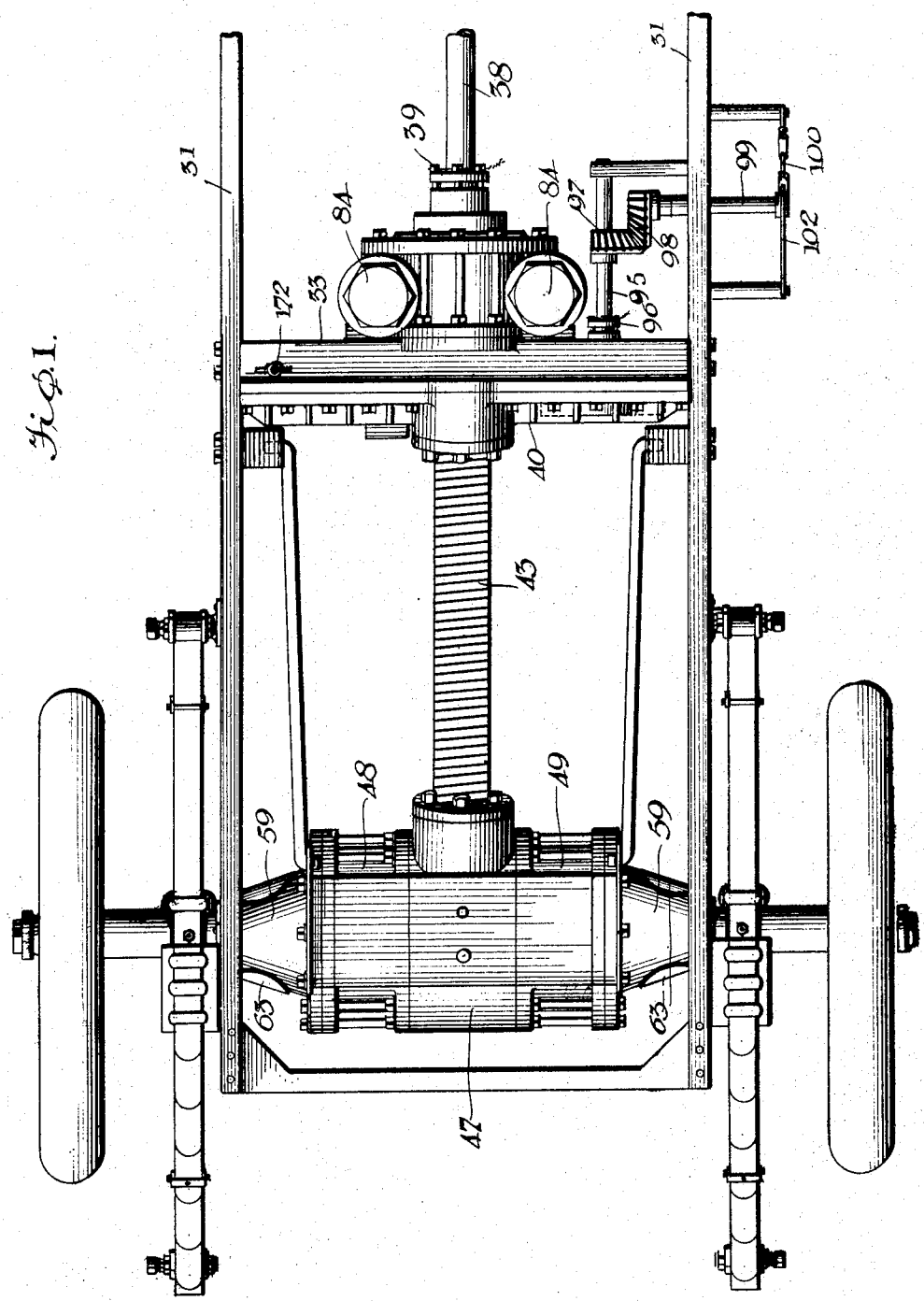

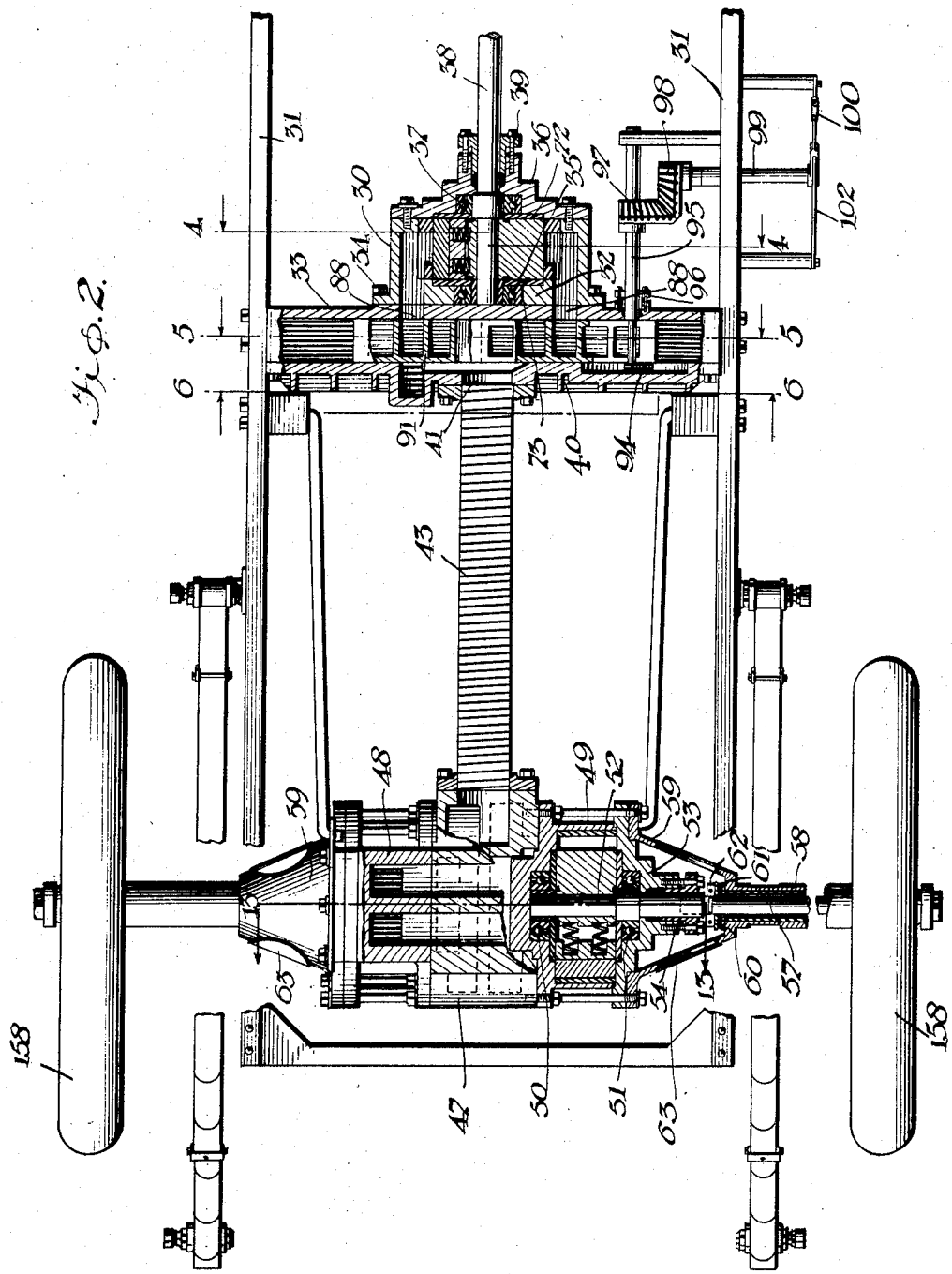

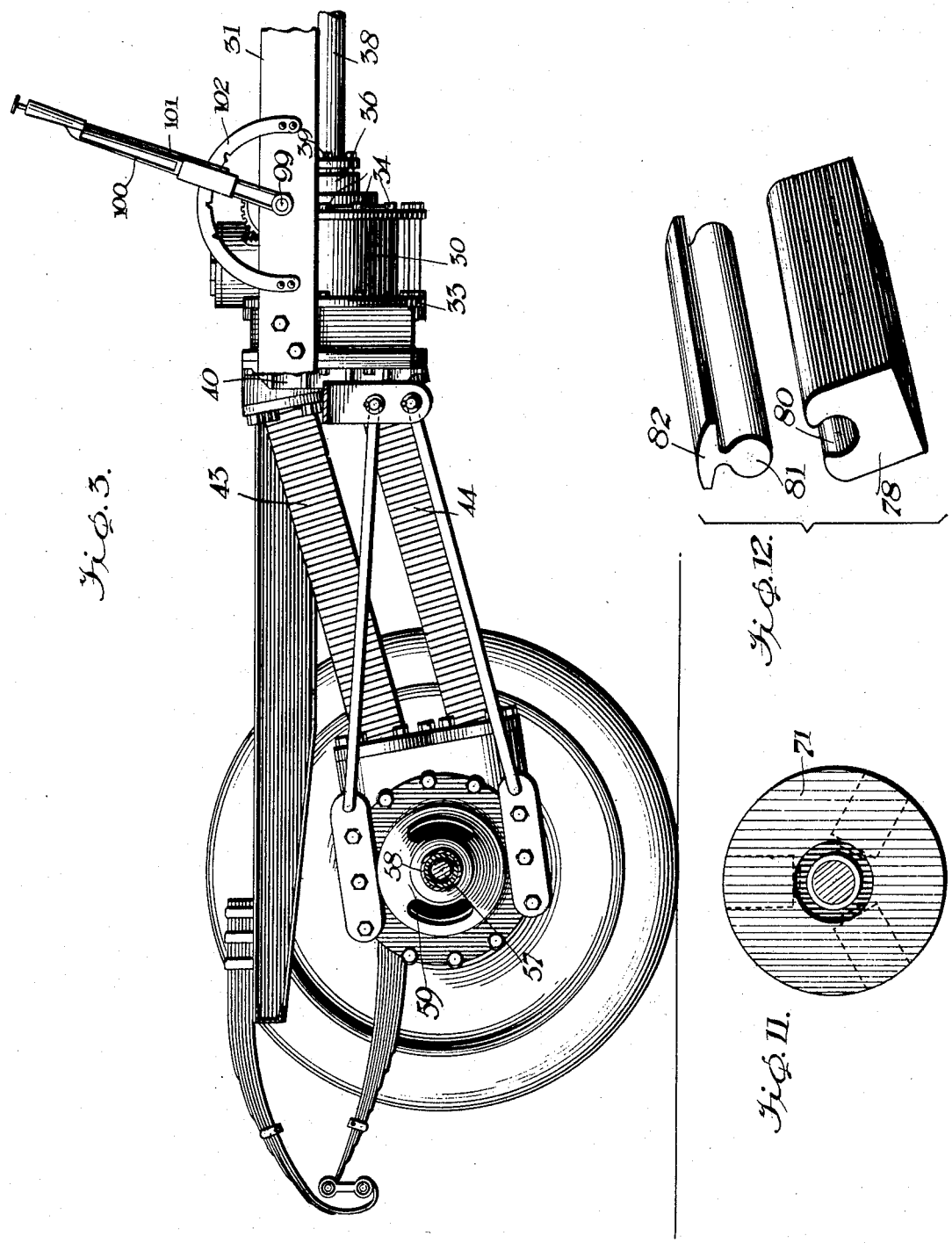

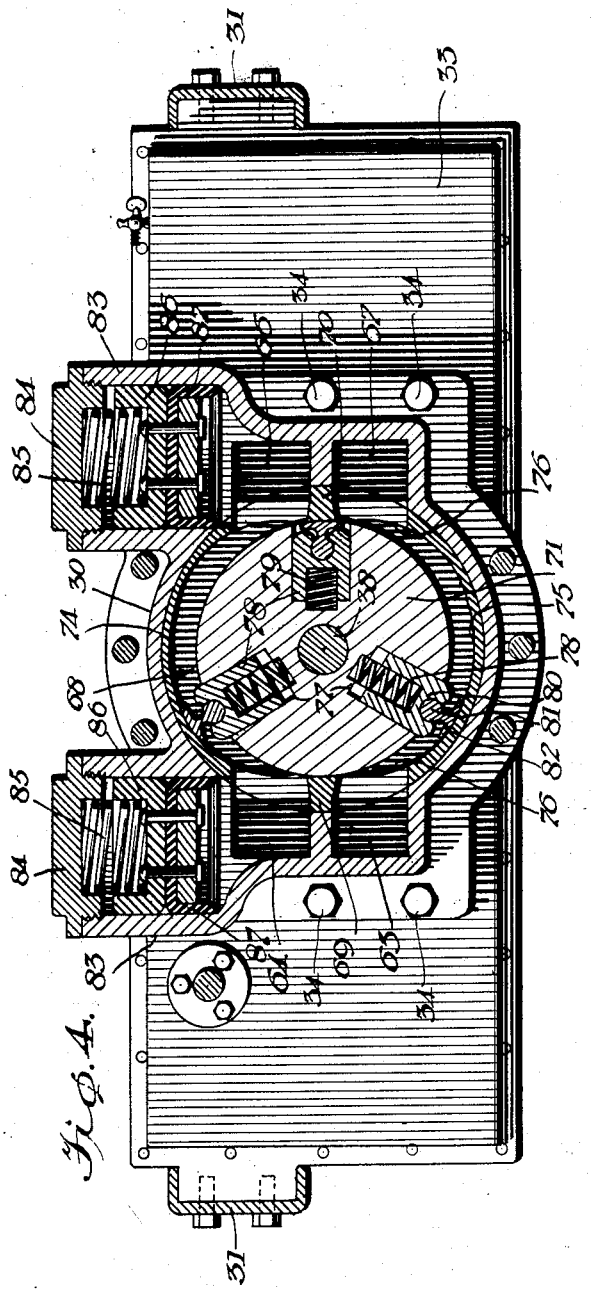

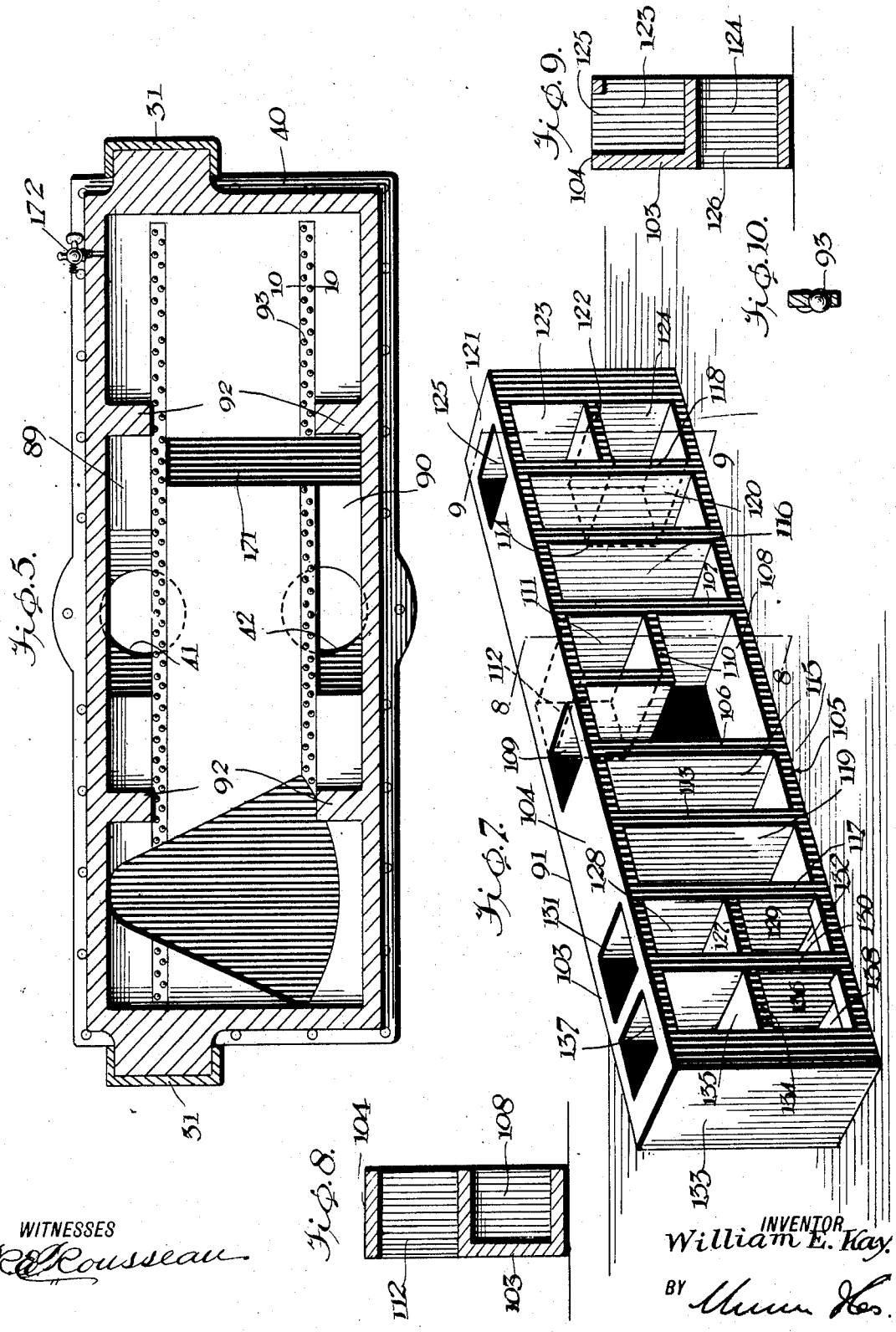

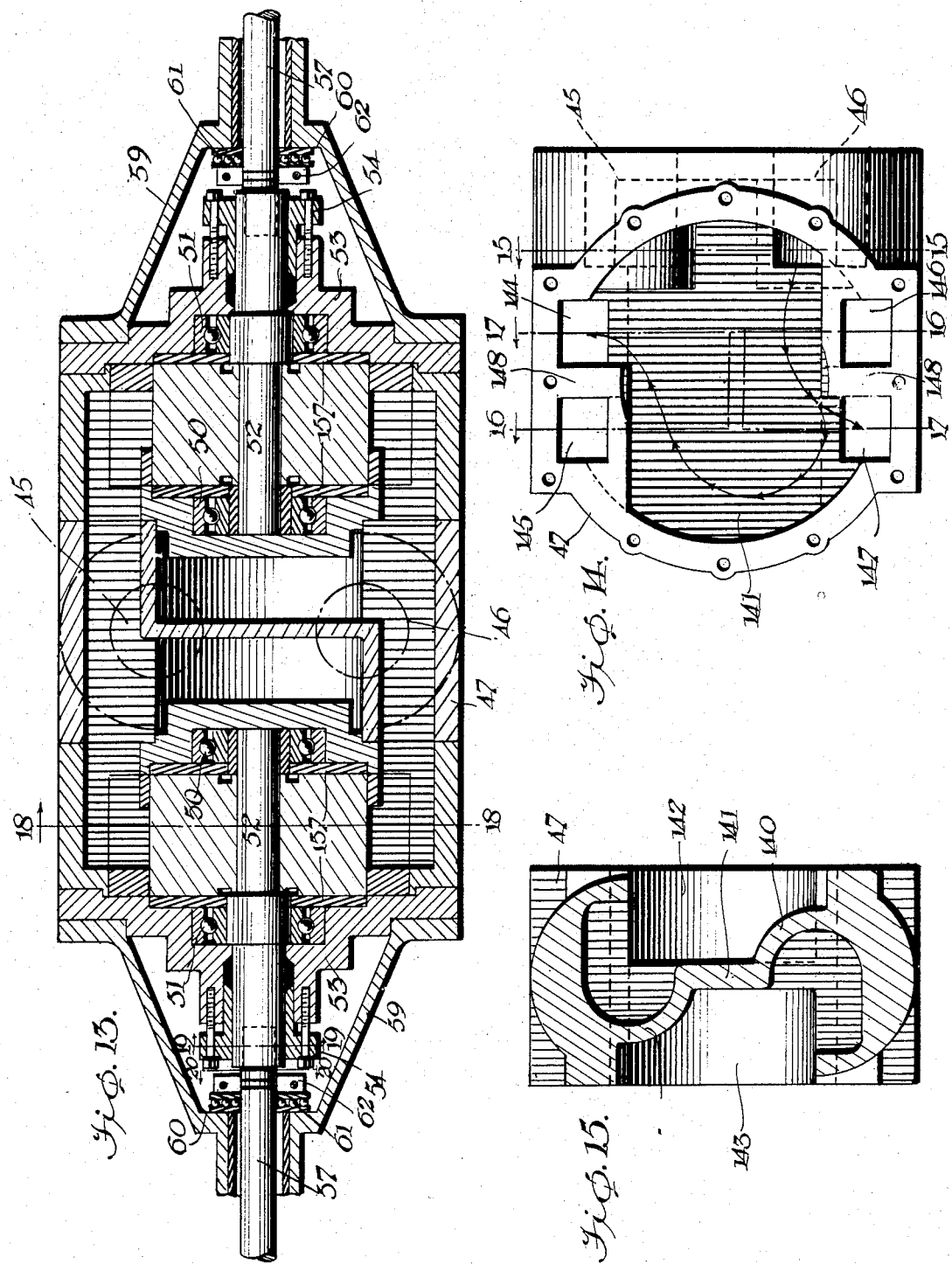

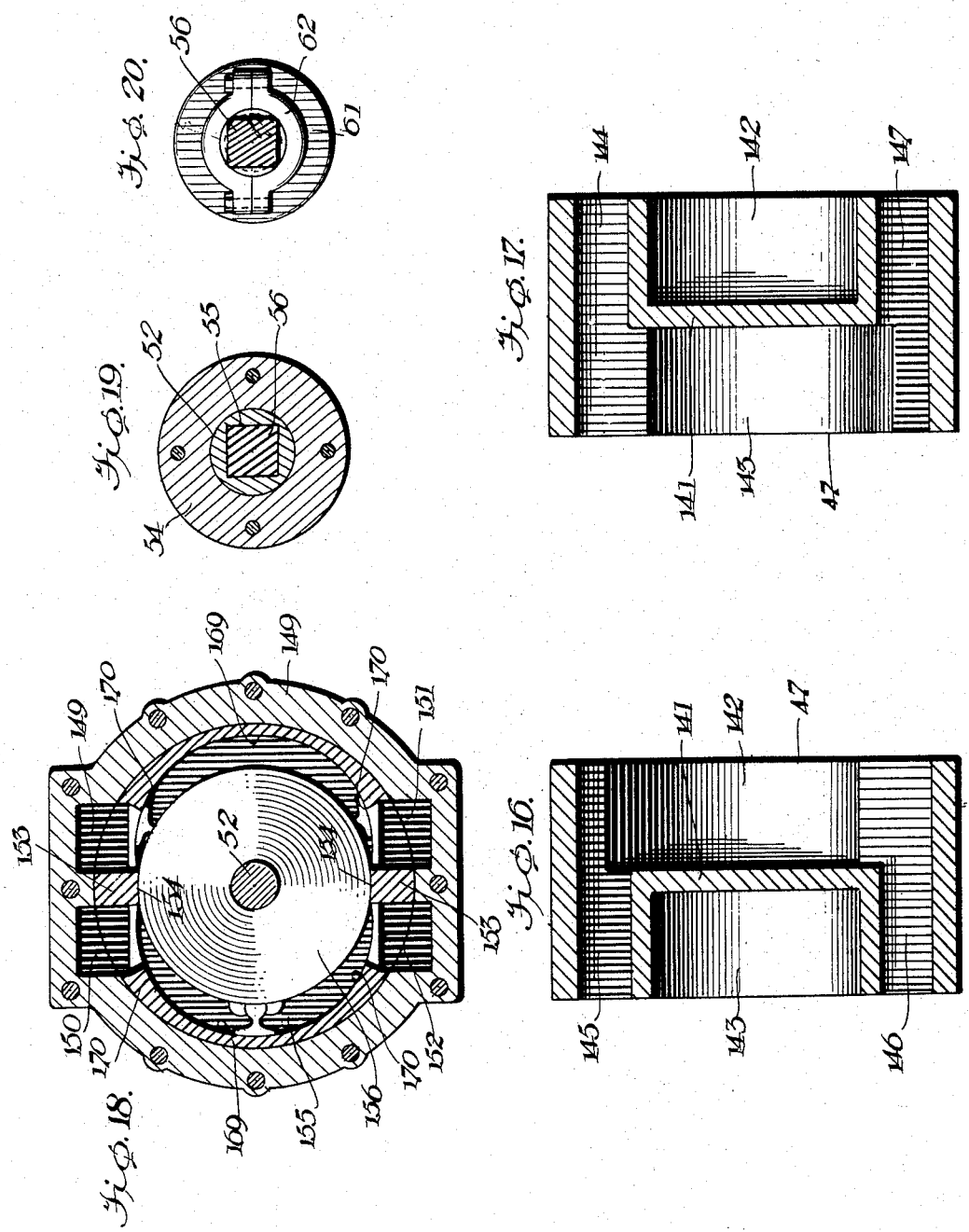

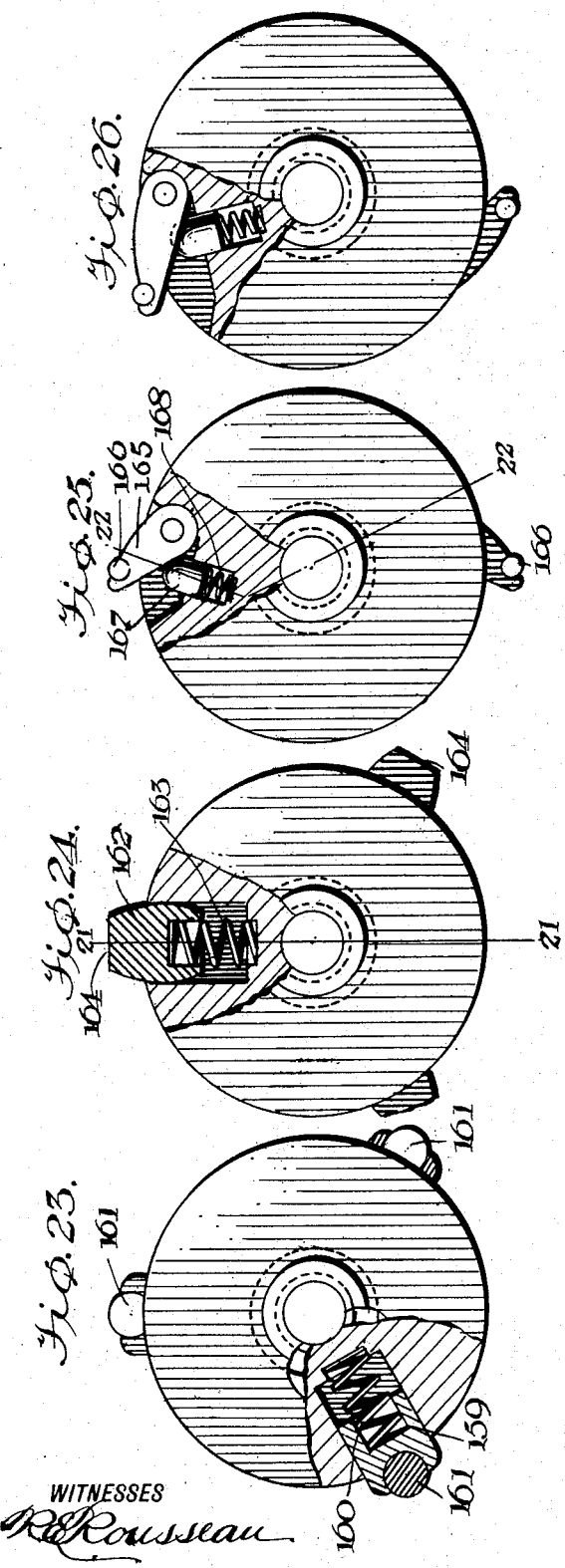
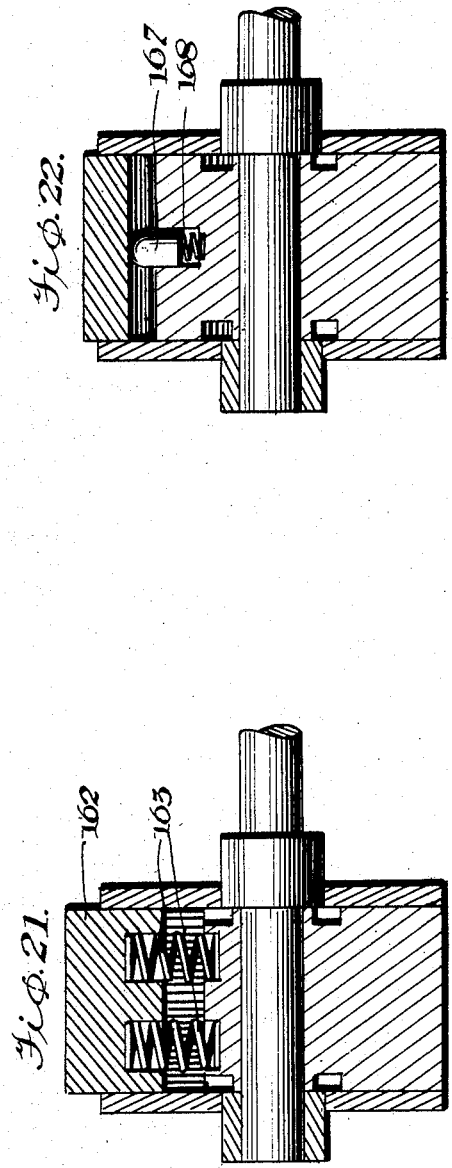

1,518,797

UNITED STATES PATENT OFFICE.

WILLIAM EDWARD KAY, OF ELYRIA, OHIO.

FLUID-TRANSMISSION DEVICE.

Application filed May 27, 1920. Serial No. 384,665.

*To all whom it may concern:*

Be it known that I, WILLIAM EDWARD KAY, a citizen of the United States, and a resident of Elyria, in the county of Lorain and State of Ohio, have invented certain new and useful Improvements in Fluid-Transmission Devices, of which the following is a specification.

My present invention relates generally to automobiles and motor cars and more particularly to a fluid power transmission device connection between the crank shaft and the rear wheels in lieu of the usual transmission gears universally joined to the propeller shaft and differential of the rear axle, my object being the provision of a practical efficient arrangement capable of effective efficient operation and readily controllable as to direction of movement and speed.

A further object is the provision of an arrangement which includes a forward pumping and controlling unit and a rear distributing and power unit, connected by flexible conduits, and including certain improved mechanisms both in the pumping and power units whereby a uniform torque of movement is insured at all times and a constant steady uniform application of power brought about at all speeds both forward and reverse.

A still further object is the provision of a mechanism in which the parts are so arranged, constructed and related as to bring about ready accessibility and permit all necessary adjustments and repairs to be readily and easily effected.

A still further object is the provision of a mechanism of this character in which provision is made for an automatic compounding of power both in reverse and in initial forward speed, the means for this purpose also acting in the other forward speeds to bring about uniform constant flow of the circulating fluid.

With the above objects and certain others which may be better understood and more thoroughly appreciated from the following description, my invention resides in the construction, arrangement and operation of the parts in relation to one another and in their details as shown in the accompanying drawings, which form a part of this specification and wherein, Figure 1 is a top plan view showing my invention, Figure 2 is a horizontal section therethrough, Figure 3 is a side elevation, Figure 4 is a vertical transverse section taken on line 4—4 of Figure 2, Figure 5 is a vertical transverse section taken on line 5—5 of Figure 2 with the slide removed, Figure 6 is another transverse vertical section taken on line 6—6 of Figure 2, Figure 7 is a detail perspective view of the controlling slide removed, Figures 8 and 9 are detail vertical transverse sections taken through the controlling slide respectively on lines 8—8 and 9—9 of Figure 7, Figure 10 is a detail vertical section through one of the bearing rails, taken on line 10—10 of Figure 5, Figure 11 is a detail side view of the skeleton rotor, Figure 12 is a detail perspective view of one of the radial vanes, Figure 13 is a vertical transverse section through the distributing and power units taken on line 13—13 of Figure 2, Figure 14 is a side view of the distributor box, Figure 15 is a vertical section through the distributor box on line 15—15 of Figure 14, Figures 16 and 17 are vertical sections through the distributor box taken respectively on lines 16—16 and 17—17 of Figure 14, Figure 18 is a vertical section through one of the motors taken on line 18—18 of Figure 13, Figures 19 and 20 are detail transverse sections through portions of one of the power shafts and the respective axle taken respectively on lines 19—19 and 20—20 of Figure 13, Figures 21 and 22 are sectional views through motors of modified form, and Figures 23, 24, 25, and 26 are side views, partly in section, showing rotors with modified forms of vanes.

Referring now to these figures the forward unit includes a pump casing 30 disposed with its axis parallel to the side frame bars 31 of the vehicle chassis and with its rear plate 32 bolted against the front wall 33 of the control box by bolts 34. This pump casing 30 has an axial bearing 35 in its rear wall and has a detachable bolted front bearing 36 provided with an axial bearing 37, the bearings 35 and 37 co-operating in the support of the rear end of a motor crank shaft 38 around which the front plate 36 has a stuffing box 39.

The control box is in communication with the pump casing as presently described and has a detachable rear plate 40 which is provided among other things with upper and lower openings 41 and 42 as seen in Figure 6 and in communication with these openings the upper forward ends of a pair of flexible conduits 43 and 44 are rigidly connected to the rear plate 40.

As best seen in Figure 3 the conduits 43 and 44 incline downwardly and rearwardly in substantially parallel relation to the rear unit and are connected to upper and lower openings 45 and 46 of a distributer box 47 disposed centrally of the rear unit, between motor casings 48 and 49 projecting laterally in opposite directions from the sides of the distributor box and which have axially alined inner and outer bearings 50 and 51 for separate drive shafts 52.

Each of the motor casings has an outer detachably bolted side plate 53 supporting the outer bearing 51 and provided with a central stuffing box 54 at the end of its respective shaft 52 where the latter has a squared axial bore 55 as seen in Figure 19 for the reception of the squared inner end 56 of the respective axle 57. Each wheel axle is journaled through the tubular outer extension 58 of a tapering housing 59 which surrounds the respective stuffing box 54 in spaced relation and is bolted at its inner enlarged end to the respective side plate 53 and which has an annularly shouldered portion 60 forming a stationary abutment for a thrust bearing 61 which is engaged by a split collar 62 secured around and in engagement with the inner portion of the respective axle 57 beyond the respective stuffing box 54. For the purpose of associating and disassociating these parts, each of the housings 59 has hand openings normally closed by covers 63 so that by detachment of the split collar 62 which is seen in detail in Figure 20, the respective wheel axle 57 may be entirely withdrawn, rendering repairs to or substitution of these parts a particularly simple operation.

In general the transmission fluid is pumped from the casing 30 through the control box to one of the flexible conduits and passes to the distributor box 47 by means of which it is distributed laterally to the two motor casings 48 and 49 from which it passes through the distributer box to the other conduit and back from the latter through the control box to the pump casing and with this general statement in mind the details of construction of the various parts to be now proceeded with may be better understood and more thoroughly appreciated.

The pump casing 30 has upper and lower channels 64 and 65 at one side and upper and lower channels 66 and 67 at its opposite side opening into diametrically opposite sides of the pump chamber 68 through communicating ports at the forward ends of the channels located above and below webs 69 and 70 whose inner ends form diametrically opposed abutments for the rotor 71 of the pump which is secured upon the motor crank shaft 38. The rotor travels with forward and rear wear plates 72 and 73 and its chamber has upper and lower concentric wall sections 74 and 75 which concentric sections merge into eccentric sections 76 at their opposite sides gradually curving into the rotor engaging surfaces of the abutments of the webs 69 and 70.

As shown in Figure 4 the rotor 71 has radial channels 77 in which are disposed radially movable vanes including follower blocks 78 whose inner ends are engaged by springs 79 disposed against the bases of the channels 77 and whose outer ends have cylindrical cavities 80 for the reception of inner cylindrical ribs 81 of the cylinder engaging wipers 82 which are thus mounted to rock or oscillate with respect to the blocks 78. At the upper portions of its opposite sides, pump casing 30 has a pair of upright cylinders 83 whose lower ends are in open communication with the upper fluid channels 64 and 66 and whose upper ends are closed by screw caps 84. These screw caps which close the upper ends of the cylinders form abutments for the upper ends of springs 85 whose lower ends engage cup shaped pistons 86 yieldable vertically under tension of the springs 85 and having lower piston leathers 87 to render the pistons fluid tight and against the pressure of fluid bearing upwardly thereupon.

The several channels 64, 65, 66 and 67 communicate at their rear ends through alined openings certain of which are seen at 88 in Figure 2, in the front wall 33 of the control box, with upper and lower spaces 89 and 90 of the control box respectively above and below the control slide 91 and respectively in communication with the openings 41 and 42 of the rear plate 40 of the control box as clearly seen in Figure 5. Within this control box, the control slide 91 is lengthwise movable in a direction transverse to the axis of the pump casing 30, upon internal ribs 92 at opposite ends of the spaces 89 and 90, and between anti-friction bearings 93, the slide 91 being movably pivoted at one end to the lower end of a crank arm 94 whose upper end is secured to the rear end of an oscillating control shaft 95. This shaft projects forwardly of the control box through a stuffing box 96 as seen in Figure 2 in the front wall 33 of the control box at one side of the pump casing 30 and the shaft has a bevel gear 97 in connection with a bevel gear 98 upon the inner end of a laterally projecting lever actuated shaft 99 from the outer end of which a control lever 100 upstands. This lever may have a suitable latch mechanism 101 engageable with a notched quadrant 102 secured upon one of the side bars 31 as seen in Figure 3.

Referring to Figure 7, the control slide 91 is in the nature of an elongated rectangular box having a rear wall 103, top and bottom walls 104 and 105 and open at its front. This box has a pair of laterally spaced vertical webs 106 and 107 extending between its top and bottom walls and forming a central chamber 108 in communication with an opening 109 in the top wall 104 and within which compartment 108 is an angular web 110 connected to the vertical web 107 and to the top wall 104 to form a channel 111 in communication at its rear end with an opening 112 through the rear wall 104 as seen in Figures 7 and 8.

Laterally spaced beyond the vertical webs 106 and 107 are vertical webs 113 and 114 forming between the same and the first named webs vertical channels 115 and 116 which are unbroken from the top to the bottom walls and around which the top, bottom and rear walls are closed. Laterally spaced beyond the walls 113 and 114 are vertical webs 117 and 118 which form between them and the said webs or walls 113 and 114 a pair of vertical channels 119 and 120 closed at their top, bottom and rear sides like the channels 115 and 116. The space between the web or wall 118 and the respective end 121 of the control box is divided by a horizontal web 122 to form upper and lower separated channels 123 and 124, the former of which communicates with an opening 125 in the top wall 104 and the latter of which communicates with an opening 126 in the rear wall 103. Likewise the space beyond the wall 117 is divided by a horizontal web 127 to form upper and lower channels 128 and 129 between the wall 117 and the wall 130 laterally spaced therefrom, the upper channel 128 communicating with an opening 131 in the top wall 104 and the lower channel 129 communicating with an opening 132 in the lower wall 105. The wall 130 is spaced from the respective end 133 of the control slide and this space is divided by a horizontal web 134, forming upper and lower channels 135 and 136, the former of which communicates with an opening 137 in the top wall 104 and the latter of which communicates with an opening 138 in the lower wall 105.

These several spaces between the vertical webs or walls are in width equal to the widths of the openings 88 of the front plate 33 of the control box, with the exception of the space between the inner pair of webs or walls 106 and 107 and it is thus obvious the channels formed above and below the horizontally disposed webs will separately communicate with the pump casing channels when brought into registry therewith, like the channels 111, while the channels 108, 115, 116, 119 and 120 will communicate with both the upper and lower channels of the pump casing at either side thereof where they may be brought into registering relation.

Having thus described the parts establishing and controlling communication between the forward ends of the flexible conduits 43 and 44, including the fluid pumping means and the means providing for a constant flow as well as for a compounding of pressure, let us refer to Figures 13 to 18 showing the connections between the rear ends of the conduits including the motors. As previously stated the rear ends of the upper and lower conduits 43 and 44 are respectively connected to openings 45 and 46 of the distributor box 47, these openings 45 and 46 being in part formed by the forward oppositely curved upper and lower portions 139 and 140 of a vertical web 141 which extends through the distributor box from its front to its rear, dividing the same into side chambers 142 and 143 which are thus in communication respectively with the conduits 43 and 44.

Transversely of the upper portion of the distributor box 47 are forward and rear fluid channels 144 and 145 and transversely of the lower portion thereof are channels 146 and 147. Of these pairs of channels, which are separated from one another by vertical transverse webs 148, the upper forward channel 144 and the lower rear channel 147 communicate at their inner ends with one side of the main dividing web 141 and thus communicate with the chamber 143. The upper rear channel 145 and the lower forward channel 146 communicate at their inner ends with the relatively opposite side of the web and thus with the chamber 142, and this particular arrangement and communicating relationship of the channels with the chambers is plainly to be seen by a comparison of Figure 14 with the sections of Figures 16 and 17.

Each of the several transverse channels of the distributor box opens at its opposite ends through opposite sides of the distributor box and the several channels are so placed that the upper forward and rear channels 144 and 145 respectively communicate with the upper forward and rear channels 149 and 150 of the two motor casings 48 and 49 and the lower forward and rear channels 146 and 147 respectively communicate with lower forward and rear channels 151 and 152 of the motor casings. The channels of each of the upper and lower pairs of channels of the motor casings are arranged upon opposite sides of diametrically opposed vertical webs 153 whose inner portions form abutments 154 in the rotor chambers 155, each of which includes a rotor 156 disposed between wear plates 157 as seen in Figure 13 respectively adjacent the inner and outer bearings 50 and 51 of its shaft 52 and it will be observed from Figure 18 that the several casing channels open into the rotor chamber at their outer ends upon relatively opposite sides of the vertical plane of the axis of the rotor at the upper and lower portions so that fluid passing into the chamber 143 of the distributor box 47 from the lower conduit 44 and through the distributor box channels 144 and 146 to the motor casing channels 149 and 152 will cause clockwise rotation of the rotors 156 which through their shafts 52 and the axles 57 will turn the rear vehicle wheels 158 in a similar direction to propel the vehicle forwardly, the fluid passing outwardly through the motor casing channels 150 and 151 and the distributor box channels 145 and 146 to the distributor box chamber 142 and thence forwardly through the flexible conduit 43.

Each of the rotors 156 may have vanes including spring actuated follower blocks and oscillating wipers similar to the blocks and wipers 78 and 82 of the pump rotor 71 previously described, and each may have follower blocks 159 pressed outwardly by springs 160 and having wiping rollers 161 journaled in partially projecting relation at their free ends for engagement with their chamber wall. Separate wipers may be dispensed with and the vanes formed wholly of blocks 162 pressed outwardly by springs 163 and with outer convex wall engaging surfaces 164 as seen in Figures 21 and 24. Moreover as seen in Figures 22, 25 and 26 the rotors may have swinging vanes 165 either with or without cylinder engaging rollers 166 and pressed outwardly by round nosed plungers 167 in turn actuated by springs 168.

As shown particularly in Figure 18 the rotor chamber of each of the motor casings 48 and 49 is formed, like the rotor chamber of the pump, with diametrically opposed concentric wall sections 169 which at their ends merge into eccentric portions 170 curving to the planes of the inner surfaces of the abutments 154 so that with the vanes disposed as shown around the rotors, there will be a completely balanced action at all times, each vane taking effective pressure successively as the pressure against other vanes is reduced or entirely relieved.

Thus in operation the parts may assume the neutral position shown in Figure 2 wherein the vertical channels 119 and 120 of the control box are in communication with the pump casing channels 64, 65, 66 and 67 so that fluid is taken in by the rotor 71, rotating clockwise in Figure 4, from the channels 64 and 67 and passes out through the channels 65 and 66 rearwardly to the control box 104 and vertically through the channels 119 and 120 and then forwardly again through the channels 64 and 67, thus completing a mere fluid circuit through the pump without passage rearwardly to the motor casings. When however the operating control lever 100 is shifted rearwardly from the neutral position shown in Figure 2 so as to move the control slide 91 to the right, looking rearwardly, the vertically spaced channels 128 and 129 are moved more or less into registry with the pump casing channels 64 and 65 at the left of the pump casing while the single vertical channel 116 moves more or less into registry with the channels 66 and 67 at the right of the pump casing so that the rotor 71 takes in fluid from the channel 64 which fluid is drawn from the upper flexible conduit 43 and into the control slide channel 128 through the upper opening 131 of the control slide and the upper compartment 89 of the control box. The fluid thus taken into the rotor chamber 68 is discharged into the pump casing channel 66 and passes rearwardly to and vertically through the control slide channel 116 and then forwardly through the pump casing channel 67, from which it is taken into the lower portion of the rotor chamber and further compressed and finally discharged through the lower left pump casing channel 65 to the control slide channel 129 from which it passes through the lower opening 132 of the slide and through the control box compartment 90 to the lower flexible conduit 44. Thus bearing in mind the previous description of the flow of fluid through the distributor box 47 and the motor casings 48 and 49 it will be understood that the slide 91 in its position last described brings about clockwise rotation of the motor rotors and thus forward propulsion of the vehicle.

It is to be noted furthermore that in this last position the fluid passes to the pump from the upper flexible conduit 43 through a single channel, namely the channel 64 and proceeds first around the upper portion of the pump rotor, through the control slide and then around the lower half of the pump rotor and is finally discharged through a single channel, namely the channel 65 to the lower flexible conduit 44 so that in this, the first speed position of the parts, the power is thus compounded in view of the difference in pressure brought about by the presence of the yieldable compounding pistons 87 in the cylinders 83 communicating with the upper portion of the pump casing and its rotor chamber above the abutments forming webs 69 and 70.

A quite similar action is present when, in order to reverse the movement of the vehicle, the control lever 100 is shifted forwardly from the neutral position of Figure 2 so as to shift the control slide 91 to the left, looking rearwardly, the channels 123 and 124 being more or less shifted into registry with the right hand channels 66 and 67 of the pump casing while the single vertical channel 115 of the control slide is shifted to register with the upper and lower left hand channels 64 and 65. In this position the rotor 71 takes in fluid from the lower right hand channel 67 from the lower flexible conduit 44 through the lower control box compartment 90 and through the control slide opening 126 (see Figure 9) and channel 124 and the fluid thus passes around the lower portion of the rotor 71 and is discharged into the lower left hand channel 65 from which it passes rearwardly to the control slide, upwardly through the control slide channel 115, forwardly through the pump casing channel 64, and then around the upper portion of the rotor 71 and is finally discharged from the pump casing channel 66 from which it passes rearwardly to the control slide channel 123 and upwardly through the control slide opening 125 and thence through the upper compartment 89 of the control box to the upper flexible conduit 43. Thus bearing in mind the previous description as to the passage of fluid through the distributor box and the motor casings it will be understood that the flow of fluid with the parts in the last mentioned position brings about counter-clockwise movement of the motor rotors and thus rearward propulsion of the vehicle. It will also be seen that as in the forward movement previously described, the power is compounded by virtue of its passage successively around the lower and upper sides of the pump rotor before discharge rearwardly.

With the parts in the forward speed position previously described, and by further rearward movement of the control lever 100, the control slide 91 is shifted farther to the right, looking rearwardly, until its channels 135 and 136, are moved more or less into registry with the left hand pump casing channels 64 and 65 at the same time its channel 111 and central chamber 108 come into registry with the right hand pump casing channels 66 and 67. With the parts in this position the pump rotor 71 takes fluid simultaneously from the channels 64 and 67 to which the fluid passes from the control slide channel 135 and control slide chamber 108, the latter taking fluid simultaneously from the upper flexible conduit 43 through the upper control box compartment 89 and through the control slide openings 109 and 137. The fluid thus taken into the rotor chamber is simultaneously discharged rearwardly through the lower left hand channel 65 and the upper right hand channel 66 into the control slide channels 136 and 111, from the former of which the fluid passes to the lower control box compartment 90 and thence to the lower flexible conduit 44 and from the latter of which the fluid passes through the rear opening 112 of the control slide (see Figure 8), and thence downwardly through a vertical channel 171 of the rear plate of the control box as seen in Figure 5 whose upper end terminates below the upper compartment 89 and whose lower end communicates with the lower compartment 90 so that fluid from the channel 111 thus flows to the lower compartment 90 and from thence into the lower flexible conduit 44.

It is thus obvious that in the last described position of the parts compounding of pressure is dispensed with at the expense of increase of speed up to the full speed of rotation of the crank shaft 38, and it is obvious that the function of the yielding pistons 87 in their cylinders 83 serve in this position simply to supplement the construction and action of the pump and the motors in maintaining a constant flow and constant pressure and a constant even torque.

In the initial setting up of the device for operation the fluid utilized therein is introduced through either of the cylinders 83, the air being allowed to exhaust through an air relief cock 172 on the upper portion of the control box as shown, and fluid is supplied at various times as becomes necessary in the operation although the construction as shown and described has proven to be particularly proof against leakage and waste.

It is obvious from the description that the transmission by impulses, so commonly a disadvantage and objection to apparatus of this nature is done away with in the present construction and arrangement and the construction has also been found to be particularly effective in that it avoids friction and undue heating of the transmission fluid, these facts combined to promote effective and efficient operation along practical lines and to complete a transmission which avoids the disadavantages of gear transmission including great loss of power commonly incident to gear transmissions.

I claim:

1. A fluid transmission comprising a forward unit including a motor driven pump having a fluid intake port and a fluid outlet port at each side thereof, a rear motor unit having pairs of intake and outlet ports including a fluid intake and a fluid outlet at each side thereof, a single pair of flexible conduits between the forward and rear units, each in permanent communication with a pair of said motor ports, and a controlling device between said pump unit and the forward ends of said conduits having means to place the intake port and outlet port at one side of the pump unit separately in communication with said conduits and at the same time place the intake and outlet ports at the opposite side of the pump unit in intercommunicating relation and cut off the same from the conduits.

2. A fluid transmission comprising a forward unit including a motor driven pump having a fluid intake port and a fluid outlet port at each side thereof, a rear motor unit having pairs of intake and outlet ports including a fluid intake and a fluid outlet at each side thereof, a single pair of flexible conduits between the forward and rear units each in permanent communication with a pair of said motor ports, and a controlling device between said pump unit and the forward ends of said conduits having means to place the intake port at one side in communication with a selected conduit and the outlet port at the opposite side in communication with the other conduit and also having means to place the intake and outlet ports at the opposite side of the unit in inter-communicating relation and cut off the the same from the conduits.

3. A fluid transmission comprising a forward unit including a motor driven pump having a fluid intake port and a fluid outlet port at each side thereof, a rear motor unit having pairs of intake and outlet ports including a fluid intake and a fluid outlet at each side thereof, a single pair of flexible conduits between the forward and rear units, each in permanent communication with a pair of said motor ports, and a controlling device between said pump unit and the forward ends of said conduits having means to place the intake port and outlet port at one side of the pump unit separately in communication with said conduits and at the same time place the intake and outlet ports at the opposite side of the pump unit in intercommunicating relation and cut off the same from the conduits and also having means to place the intake ports at both sides of the pump unit in communication with one conduit and the outlet ports at both sides of the said unit in communication with the other conduit.

4. A fluid transmission comprising a forward unit including a motor driven pump having fluid ports, a rear unit including laterally spaced shaft actuating motors and a fluid distributing device between the motors, fluid conduits extending from the forward unit to the distributing device of the rear unit, and means to control and cut off communication between the conduits and the pump including a single laterally movable slide having a plurality of vertically and longitudinally spaced channels certain of which when positioned opposite the pump ports connect the latter for independent circulation through the pump exclusive of the conduits and the rear unit.

5. A fluid transmission comprising a forward circulating pump receiving and discharging fluid at each side thereof, a rear unit including shaft actuating motors, circulating conduits between the pump and the motors, and a controlling device having means to establish communication between each conduit and both sides of the pump and also having means to limit communication of each conduit to one side only of the pump and at the same time place opposite sides of the pump in communicating relation.

6. A fluid transmission including a forward circulating pump receiving and discharging fluid at each side, rear shaft actuating motors, fluid circulating conduits communicating at their rear ends with the motors, and means controlling communication between the forward ends of the conduits and the pump, including a multi-channeled control member having channels establishing communication between each of the conduits and both sides of the pump, and having other channels movable to place opposite sides of the pump in communicating relation and at the same time limit communication of each conduit to one side only of the pump.

7. A fluid transmission including a forward circulating pump receiving and discharging fluid at each side, rear shaft actuating motors, fluid circulating conduits communicating at their rear ends with the motors, and means controlling communication between the forward ends of the conduits and the pump, including a multi-channeled slide having channels establishing communication between each of the conduits and one and both sides of the pump, and having other channels movable to place one and opposite sides of the pump in freely communicating relation and at the same time cut off communication at one and both sides with the conduits.

8. A fluid transmission comprising a rear motor unit including shaft actuating motors, and a fluid distributing device in communication with the motors, fluid conduits in communication at their rear ends with the said distributing device, a forward motor actuated pump having vertically spaced intake and outlet ports at opposite sides, a control box at the rear of the pump with which the forward end of the said conduits are connected, and a multi-channeled slide valve in the control box having a lengthwise series of channels, certain of which are divided into upper and lower compartments, movable to separately register between the pump intake and outlet ports with the said conduits for the purpose of controlling the direction and speed of movement of the fluid.

9. A fluid transmission including a rear motor unit, a forward pumping unit, conduits communicating between the units, said pumping unit including a motor driven pump having means to take in and discharge fluid at both sides thereof, a control device for establishing communication between each of said conduits and both sides of the pump and also having means to limit communication of the conduits to one side only of the pump and place opposite sides of the pump in communication with one another, and yielding means in connection with opposite sides of the pump to permit of the compounding of power as described.

10. A fluid transmission including a rear motor unit, a forward pumping unit, conduits communicating between the units, said pumping unit including a motor driven pump having means to take in and discharge fluid at each side thereof, a control device for establishing communication between each of said conduits and both sides of the pump and also having means to limit communication of the conduits to one side only of the pump and place the intake and discharge means at the opposite side of the pump in communication with one another, piston cylinders in communication with opposite sides of the pump, and yielding pistons in the said cylinders for the purpose described.

11. A fluid transmission including a rear motor unit, a forward circulating pump having intake and discharge means at both sides, conduits between the pump and the motor unit, a circulation control device for controlling direction and extent of movement of the fluid from the pump, including a multi-channeled member adjustable to establish control and cut off communication between both sides of the pump and each of the conduits, and a hand controlled lever operatively connected to said adjustable control member as described.

12. A fluid transmission including a rear unit having a pair of driven shafts, motor casings through which the shafts are journaled, a motor for each shaft within its respective casing, a shaft housing secured to and outstanding from the outer side of each motor casing, a longitudinally displaceable axle having a telescoping non-rotatable connection with each shaft and having a bearing intermediate its ends in the outer portion of the respective housing, and a thrust member around each axle and in engagement with a portion of the respective shaft housing inwardly beyond said bearing to normally prevent displacement of the axle.

13. A fluid transmission including a rear motor unit comprising axially alined driven shafts, fluid motors mounted separately on said shafts, and a stationary fluid distributor between the motors having a central partition dividing the same into side chambers and having a pair of fluid intake openings separately communicating with said chambers and pairs of laterally extending upper and lower fluid distributing passages, one of the passages of each pair being in communication between one of the chambers and opposite sides of each of the motors and the other passages being in communication between the other chamber and opposite sides of each of the motors.

14. A fluid transmission including a rear motor unit comprising axially alined driven shafts, fluid motors mounted separately on said shafts, and a stationary fluid distributor between the motors having an internal web dividing the same into chambers and fluid intake openings separately communicating with the chambers, and also having pairs of distributing passages projecting laterally in opposite directions beyond the web, each pair communicating between one of the chambers and the same side of both of the motors as described.

15. A fluid transmission including a fluid circulating pump, fluid actuated motors, conduits between the pump and motors and a circulation controlling device, the said pump having intake and outlet fluid passages at opposite sides thereof and the said control device including a multi-channeled slide having certain channels arranged to separately communicate between the conduits and the passages at opposite sides of the pump.

16. A fluid transmission including a fluid circulating pump, fluid actuated motors, conduits between the pump and motors and a circulation controlling device, the said pump having intake and outlet fluid passages at opposite sides thereof and the said control device including a multi-channeled slide having certain channels arranged to separately communicate between the conduit and the passages at one side of the pump and establish communication between the passages at the opposite side of the pump.

17. A fluid transmission including a fluid circulating pump, fluid actuated motors, conduits between the pump and motors and a circulation controlling device, the said pump having intake and outlet fluid passages at opposite sides thereof and the said control device including a multi-channeled slide having certain channels to separately communicate between the conduits and the passages at each side of the pump and other channels to separately communicate between the conduits and the passages at one side of the pump and establish communication between the passages at the opposite side of the pump.

18. A fluid transmission including a fluid circulating pump, fluid actuated motors, conduits between the pump and motors and a circulation controlling device, the said pump having intake and outlet fluid passages at opposite sides thereof and the said control device including a multi-channeled slide having certain channels to separately communicate between the conduits and the passages at each side of the pump and having other channels to establish communication between the passages at each side of the pump.

19. A fluid transmission including a fluid circulating pump, fluid actuated motors, conduits between the pump and motors and a circulation controlling device, the said pump having intake and outlet fluid passages at opposite sides thereof and the said control device including a multi-channeled slide having certain channels to separately communicate between the conduits and the passages at each side of the pump, other channels to separately communicate between the conduits and the passages at one side of the pump and establish communication between the passages at the other side of the pump and having still other channels to communicate between the passages at each side of the pump.

WILLIAM EDWARD KAY.